United States Patent [19]

Nielsen et al.

[11] Patent Number: 5,430,651

[45] Date of Patent: Jul. 4, 1995

[54] POSITION CONTROL SYSTEM FOR A CONSTRUCTION IMPLEMENT SUCH AS A ROAD GRADER

[75] Inventors: Edward G. Nielsen, Grand Rapids; Ross C. Stoepker, Kentwood; Fred D. Litty, Grand Rapids, all of Mich.

[73] Assignee: Laser Alignment, Inc., Grand Rapids, Mich.

[21] Appl. No.: 269,838

[22] Filed: Jul. 1, 1994

Related U.S. Application Data

[63] Continuation of Ser. No. 656,792, Feb. 15, 1991, Pat. No. 5,327,345.

[51] Int. Cl.$^6$ .................. E01C 19/00; A01B 63/10
[52] U.S. Cl. ................... 364/424.07; 172/4.5
[58] Field of Search ............... 364/424.07; 172/4.5

[56] References Cited

U.S. PATENT DOCUMENTS

| Re. 28,979 | 9/1976 | Long et al. | 172/4.5 |
|---|---|---|---|
| 3,044,195 | 7/1962 | Atkinson | 37/143 |
| 3,156,989 | 11/1964 | Atkinson | 37/143 |
| 3,554,291 | 1/1971 | Rogers | 172/4.5 |
| 3,705,381 | 12/1972 | Pipkin | 367/99 |
| 3,749,504 | 7/1973 | Smith | 404/84.2 |
| 3,786,871 | 1/1974 | Long et al. | 172/4.5 |
| 3,887,012 | 6/1975 | Scholl et al. | 172/4.5 |
| 4,025,895 | 5/1977 | Shatto | 367/106 |
| 4,081,033 | 3/1978 | Bulger et al. | 174/4.5 |
| 4,085,805 | 4/1978 | Hawkins et al. | 172/4.5 |
| 4,136,508 | 1/1979 | Coleman et al. | 56/208 |
| 4,213,503 | 7/1980 | Elmberg et al. | 172/4.5 |
| 4,414,792 | 11/1983 | Bettencourt et al. | 56/102 |
| 4,425,751 | 1/1984 | Bousseau et al. | 56/327.2 |
| 4,437,295 | 3/1984 | Rock | 56/10.2 |
| 4,561,064 | 12/1985 | Brüggen et al. | 364/561 |
| 4,573,124 | 2/1986 | Seiferling | 364/424.07 |
| 4,663,712 | 5/1987 | Kishida | 364/424.07 |
| 4,679,175 | 7/1987 | Eder et al. | 367/902 |
| 4,693,598 | 9/1987 | Sehr | 356/4 |
| 4,726,682 | 2/1988 | Harms et al. | 356/375 |
| 4,733,355 | 3/1988 | Davidson et al. | 364/424.07 |
| 4,750,584 | 6/1988 | Tanaka et al. | 181/123 |
| 4,762,001 | 8/1988 | Wuttke | 367/902 |
| 4,791,618 | 12/1988 | Pruchnik | 364/422 |
| 4,797,822 | 1/1989 | Peters | 364/422 |
| 4,808,996 | 2/1989 | Zimmer | 364/422 |
| 4,820,041 | 4/1989 | Davidson et al. | 356/1 |
| 4,835,691 | 5/1989 | Rotem et al. | 364/424.02 |
| 4,852,665 | 8/1989 | Peltier et al. | 364/422 |
| 4,868,796 | 9/1989 | Ahrens et al. | 367/99 X |
| 4,912,643 | 3/1990 | Beirxe | 364/449 |
| 4,914,593 | 4/1990 | Middleton et al. | 364/424.07 |
| 4,920,520 | 4/1990 | Göbel et al. | 367/99 |
| 4,924,374 | 5/1990 | Middleton et al. | 364/424.07 |
| 4,933,853 | 6/1990 | Musil et al. | 364/424.07 |
| 4,961,173 | 10/1990 | Sehr et al. | 367/96 |
| 5,019,978 | 5/1991 | Howard, Jr. et al. | 364/422 |
| 5,062,048 | 10/1991 | Coulter et al. | 364/422 |
| 5,079,751 | 1/1992 | Woodward | 367/99 X |
| 5,155,983 | 10/1992 | Sheehan et al. | 56/10.2 |
| 5,327,345 | 7/1994 | Nielsen et al. | 364/424.07 |

FOREIGN PATENT DOCUMENTS

3506304C1 4/1986 Germany.

OTHER PUBLICATIONS

AGTEK, "Blade Control System," Product Brochure, Dec. 1987.

Honeywell ABS 1000, "Automatic Blade System for Cat Series G Motor Graders".

*Primary Examiner*—Vincent N. Trans
*Attorney, Agent, or Firm*—Price, Heneveld, Cooper, DeWitt & Litton

[57] ABSTRACT

An ultrasonic sensor for a construction implement is disclosed which provides an indication of the position of the sensor relative to a reference surface in two dimensions. In a preferred embodiment of the invention, a pair of sensors are positioned a predetermined distance from one another to transmit and receive ultrasonic waves to measure the time it takes the waves to travel to the reference surface and be reflected back to the ultrasonic transducers. Additionally, a transducer is disclosed which detects a side lobe of a acoustic wave transmitted by an acoustic transducer whereby the velocity of said acoustic pulse may be calculated.

18 Claims, 5 Drawing Sheets

POSITION CONTROL SYSTEM FOR A CONSTRUCTION IMPLEMENT SUCH AS A ROAD GRADER

This is a continuation of application Ser. No. 07/656,792, filed Feb. 15, 1991, U.S. Pat. No. 5,327,345.

BACKGROUND OF THE INVENTION

The present invention pertains to a construction apparatus that is capable of vertical and/or horizontal adjustment, and more particularly to a control for establishing the height and/or lateral displacement of such a tool.

Mechanisms are known which assist an operator of a construction implement in following a reference guide. For example, mechanical elements, which are adapted for contacting a reference string, are mounted on the construction implement tool, such as a road grader blade, in order to provide an indication of the position of the string relative to the blade to control the elevation of the blade. However, these mechanical elements physically displace the string and consequently do not reliably indicate the height of the tool relative to the string. Additionally, the mechanical elements are prone to falling off the string and require manual replacement on the string.

An improvement over the mechanical element is an ultrasonic transducer. In addition to a string, these sensors may be used with a curb, or the road bed, as a reference surface. For example, U.S. Pat. No. 4,924,374 issued to Middleton et al., entitled METHOD FOR AUTOMATIC POSITION CONTROL OF A TOOL, discloses an ultrasonic sensor and control apparatus for a construction implement. The ultrasonic transducer measures the time it takes for an acoustic pulse to travel from the transducer to the reference surface and back to the transducer. Although these sensors provide an improvement over the mechanical sensing element, the ultrasonic sensor only measures the time that it takes for a pulse to travel from the sensor to the reference surface and back, and accordingly only measures the absolute distance to the reference surface and not the true elevation of the blade. If the sensor is laterally shifted from a reference string, there may be a large error introduced in the measurement. The control system used with the ultrasonic system will adjust the height of the blade until the distance between the ultrasonic transducer and the reference guide is at the preset distance. However, because the distance is a function of both lateral and vertical displacement, the control system will adjust the blade to an incorrect elevation.

Construction implements are known which include position control mechanisms. For example, some road graders include control mechanisms for the grader blade which may be used to mechanically adjust the lateral position of the blade relative to the grader. For example, U.S. Pat. No. 4,733,355 entitled NON-CONTACTING RANGE SENSING AND CONTROL DEVICE shows a grader including a sensor which measures the lateral distance from a curb with any resulting error being used to laterally reposition the blade. However, the reference does not provide a practical scheme for controlling the blade height and lateral position with respect to a curb. Further, the reference does not show a practical scheme for following a string.

Ultrasonic sensors require calibration to compensate for changes in the velocity of the acoustic pulse resulting from changes in air conditions such as temperature and humidity. The increases and decreases in velocity cause inaccuracy in the control system because the distance measured is a function of velocity. Various methods have been developed to overcome this problem. For example, the Middleton et al. patent, mentioned above, includes a thermister, which senses variations in temperature and compensates for variations in temperature automatically. However, the thermister does not provide an indication of all the air parameters which affect the velocity of the acoustic pulse such as humidity. Another known system for compensating for changes in pulse velocity includes a reference surface which is spaced a predetermined distance directly in front of an ultrasonic transducer. The time that it takes a pulse from the transducer to travel to the fixed reference surface and back is continuously measured, and the measured time is used to compensate for variations in the air conditions. However, if such a calibration reference surface is used with a construction implement it interferes with the monitoring of the actual reference surface, which must be accurately monitored to control the height of the blade, and is vulnerable to damage.

SUMMARY OF THE PRESENT INVENTION

The present invention is embodied in a sensor system utilizing two ultrasonic transducers in spaced relationship to one another. In one embodiment of the invention, relative positioning of two sensors allows the electronic circuitry associated therewith to detect both a vertical and a lateral distance of the sensor relative to a reference surface. One of the transducers transmits an acoustic wave that is reflected off a reference surface and detected by both of the transducers in order to determine vertical and lateral distances. In another embodiment of the invention, a pair of transducers are positioned orthogonally to one another to measure the distance between each transducer and a respective orthogonal surface of a reference.

According to another aspect of the invention, a calibration system is provided which allows the velocity of an acoustic wave to be accurately measured. In one embodiment of the invention one of two transducers is positioned to detect the side lobe of an acoustic wave generated by the other transducer. In another embodiment of the invention, two transducers are placed side-by-side and a pair of reflectors are positioned at the outside range of each of the two transducers. An acoustic wave generated by one of the transducers will travel to the other transducer via the reflectors on a path having a predetermined distance in order to determine the velocity of the wave.

According to yet another aspect of the invention, the sensor may be used with a road grader to control the vertical and lateral position of the grading blade of the grader relative to a reference. In one embodiment of the invention, the sensor is used with a construction tool control unit to automatically control the blade position.

The invention accordingly has several advantages. First, the acoustic sensors allow the lateral and vertical displacements of the sensor relative to a reference surface to be accurately determined. Additionally, the calibration system does not interfere with the operation of the sensor and provides an accurate indication of the changing velocity of acoustic waves output by the transducer. Further control over the construction implement is greatly improved. These and other objects, advantages and features of the invention will become apparent upon review of the following specification in combination with the drawings.

DETAILED DESCRIPTION OF THE PREFERRED EMBODIMENTS

Figure 1:
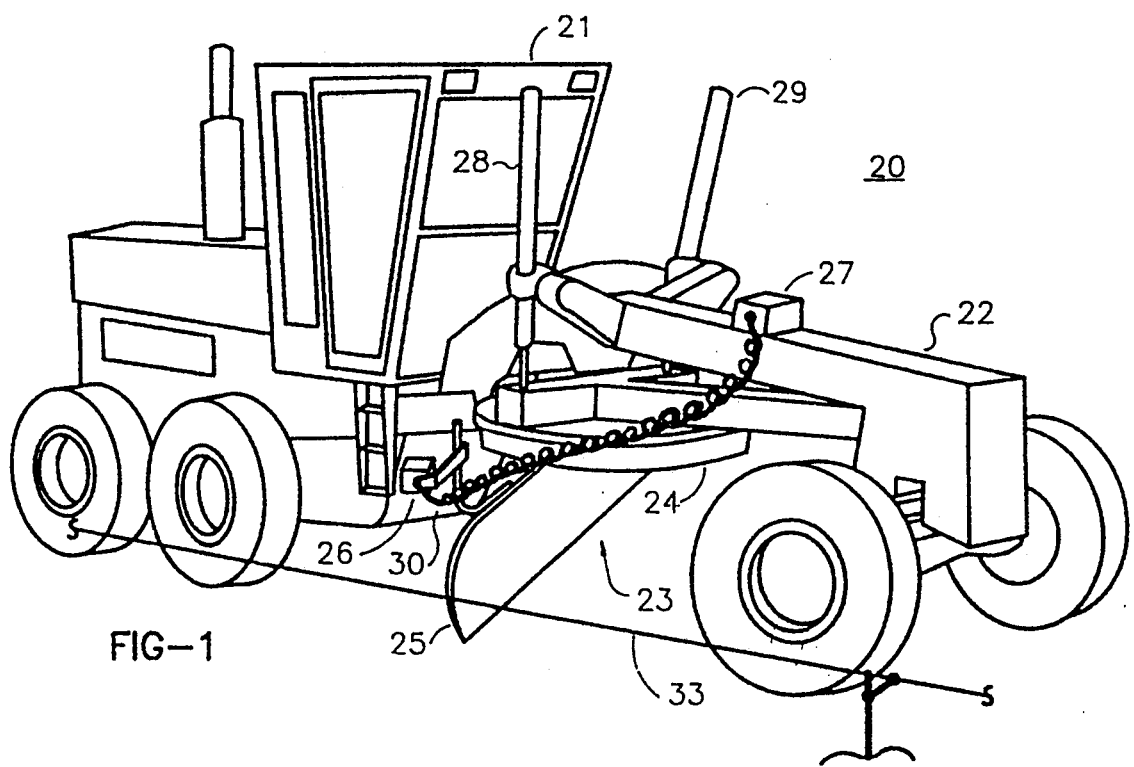
FIG. 1 is a perspective view of a road grader including a sensor system according to the invention.
Figure 5:
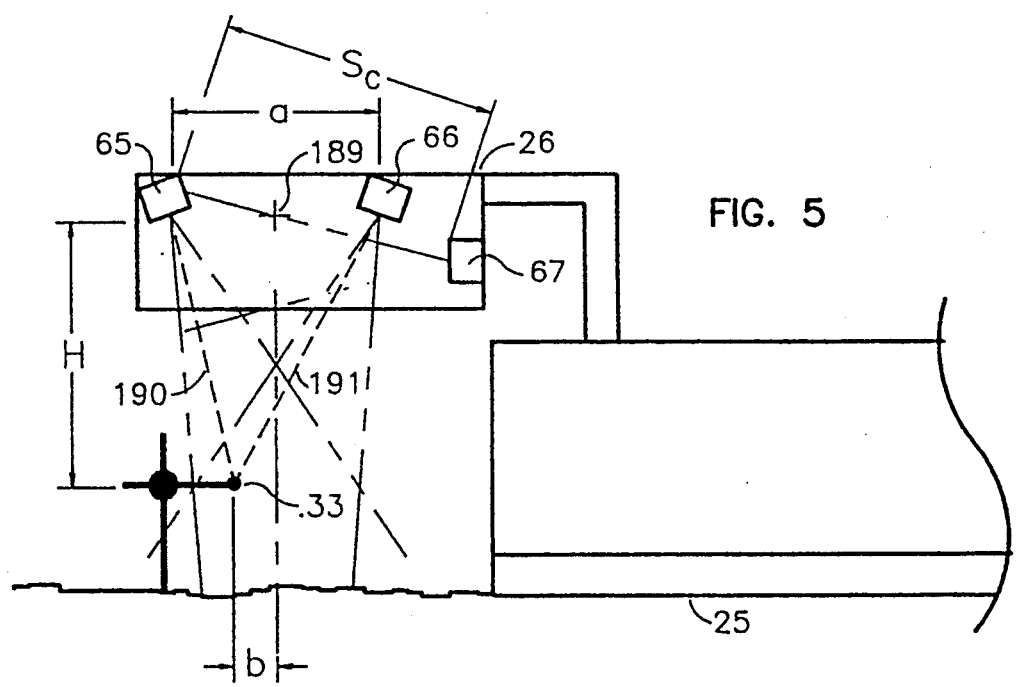
FIG. 5 is a front elevational view of a blade section including a sensor system according to the invention used with a string guide.

Referring now specifically to the drawings, and the illustrative embodiment depicted therein, a road grader 20 (FIG. 1) includes a frame 22, an operator housing 21 on a rear portion thereof, and a blade assembly 23 mounted to the frame. The blade assembly includes a blade platform 24 which carries the road grader blade 25 and is coupled to a front portion of frame 22 in a manner to be described below. Blade 25, in turn, carries a sensor 26 which is coupled to a control unit 27 by a wire 30. Control unit 27, in turn, is coupled to position control mechanisms 28 and 29 in a manner described below with reference to FIG. 2. A reference string 33 is illustrated adjacent road grader 20 and provides a reference surface which road grader 20 follows in grading road beds, for example. Although the reference surface is illustrated as a string, it will be understood that a curb or a previously graded road bed could be used as a reference surface for the sensor 26.

Figure 2:
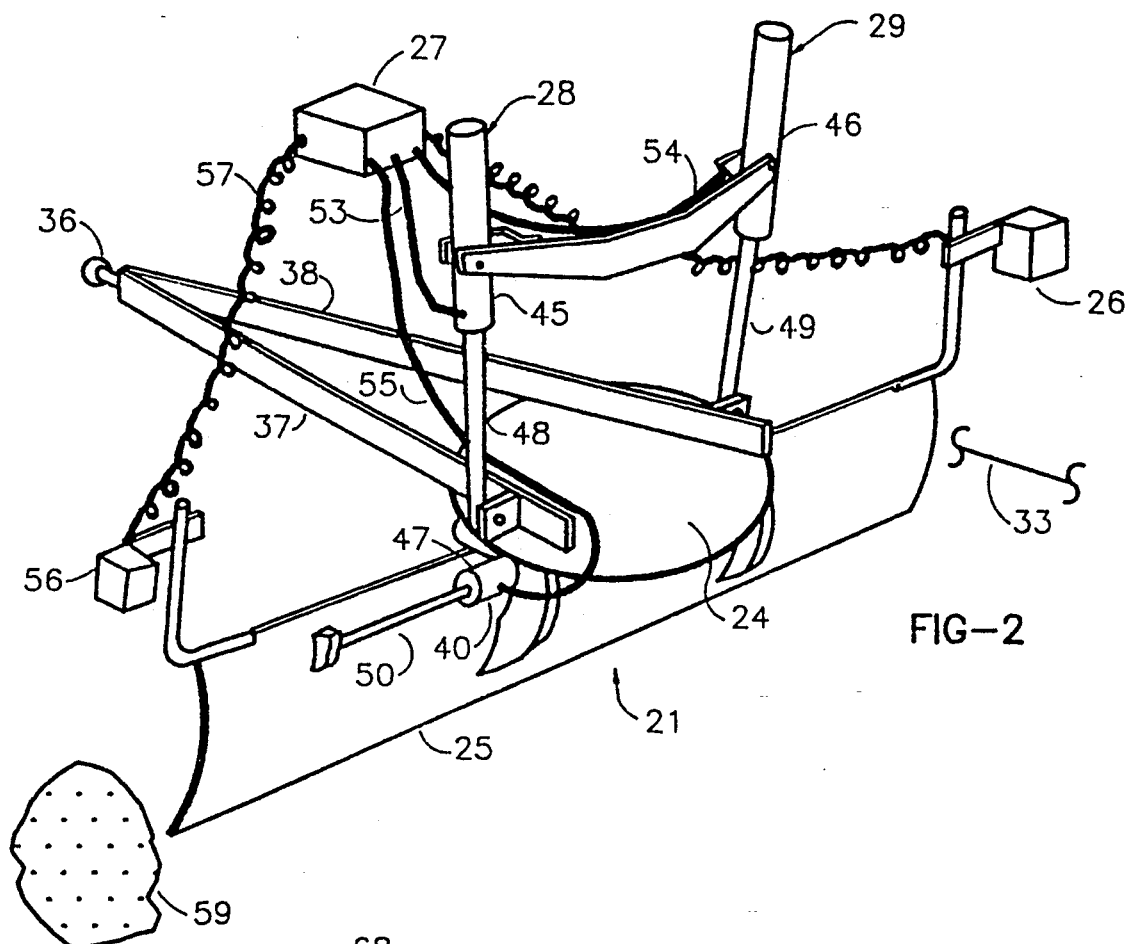
FIG. 2 is a perspective view of the grader blade control system incorporating a sensor system according to the invention.

Blade platform 24, which carries blade 25, is connected by a pair of supports 37 and 38 (FIG. 2) to a ball 36 which is carried within a socket (not shown) on front frame 22 (FIG. 1). The blade assembly 23 (FIG. 2) is thus free to pivot under the control of position control mechanisms 28, 29 and 40. The control mechanisms may include, by way of example, hydraulic cylinders 45, 46 and 47, which control the position of rods 48, 49 and 50, respectively, being driven by proportional hydraulic valves responsive to electrical signals as is well-known. The position of blade 25, relative to reference string 33, is monitored by sensor 26 which is fixedly connected to the blade and connected via wire 30 to control module 27. Control module 27, in turn, is connected to control mechanisms 28, 29 and 30 via connectors 53, 54 and 55, respectively, which provide electrical or hydraulic control signals from said control module 27 to mechanisms 28, 29, and 40. An additional sensor 56, connected by wire 57 to control unit 27, may be provided to monitor the distance between sensor 56 and a second reference surface 59 which may be, for example, previously graded earth. By measuring the distance between both sensors 26 and 56 and references 33 and 59, respectively, the position of blade 25 relative to both reference surfaces may be monitored and controlled by control unit 27 and position mechanisms 28 and 29, as is known in the art.

Figure 3:
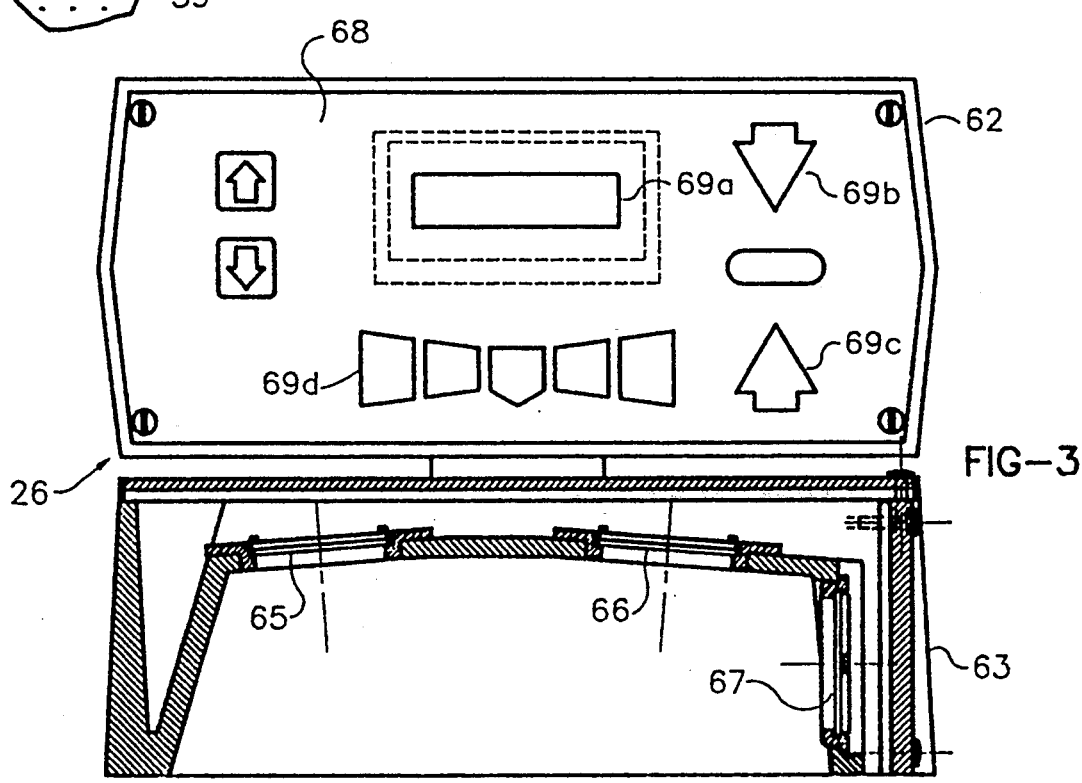
FIG. 3 is a front view of a sensor housing including a transducer arrangement according to the invention.

Sensor 26 includes an upper housing 62 and a lower housing 63 (FIG. 3). Referring initially to lower housing 63, sensor 26 includes a first ultrasonic transducer 65, a second ultrasonic transducer 66 and a third ultrasonic transducer 67. Ultrasonic transducers 65, 66 and 67 transmit and/or receive acoustic waves in a well-known manner and, accordingly, the transducers are not described in greater detail herein. These transducers are commercially available, and may be, for example, provided by part number 604,142 manufactured by Polaroid Inc. Transducer 67 provides calibration for the sensor by detecting a side lobe of the acoustic pulse transmitted by transducers 65, as further described below. Upper housing 62 is electronically connected to transducers 65, 66 and 67 and includes a display panel 68, as well as providing an output signal connected to control unit 27 (FIG. 1) via wire 30. Display panel 68 includes an LCD display 69a providing information to the operator of sensor 26, which information may be used to initially calibrate the sensor, or to display the operating mode of the sensor (e.g., string, curb or road bed). The display panel also includes vertical indicator arrows 69b and 69c which indicate when sensor 26 is above or below the initial calibrated distance between the sensor and the reference surface 33, and an indicator 69d for indicating lateral displacement of the midpoint of transducers 65 and 66 relative to a reference such as guide 33. Indicator arrows 69b–69d may be illuminated, for example, by light emitting diodes positioned under the surface of the display panel.

Figure 4A:
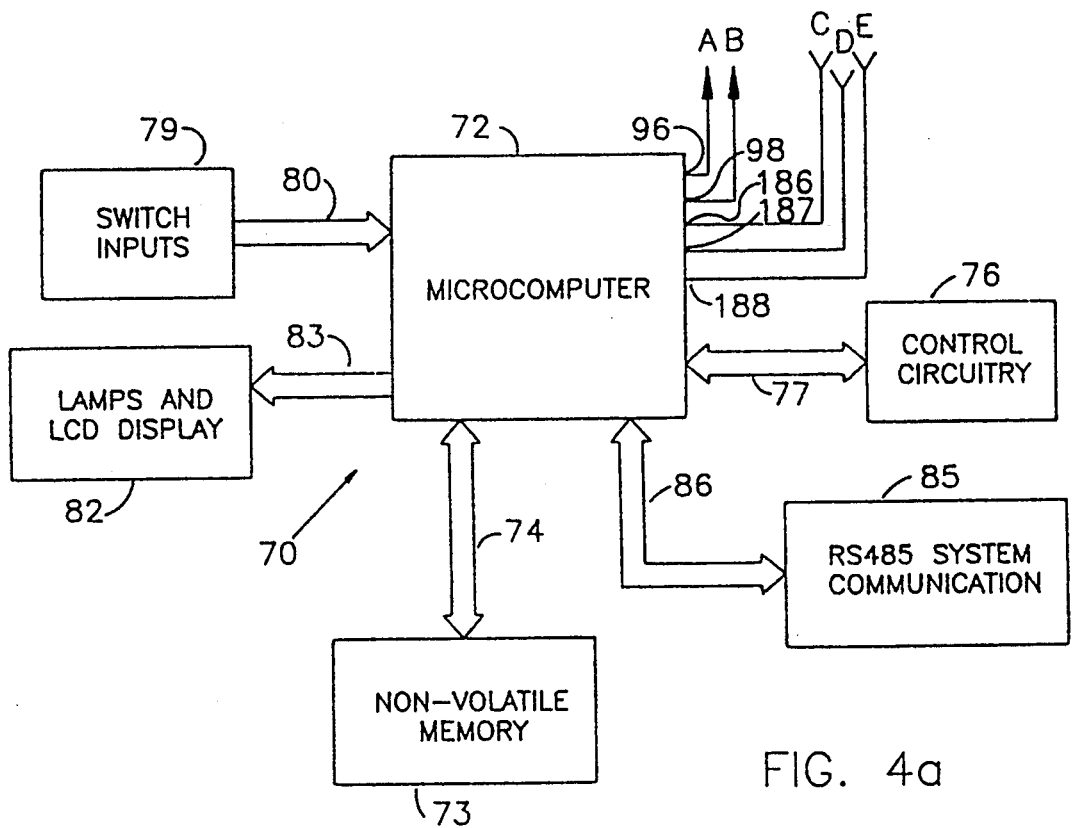
FIGS. 4a and 4b are schematic diagrams illustrating a circuit for providing control signals according to the invention.
Figure 4B:
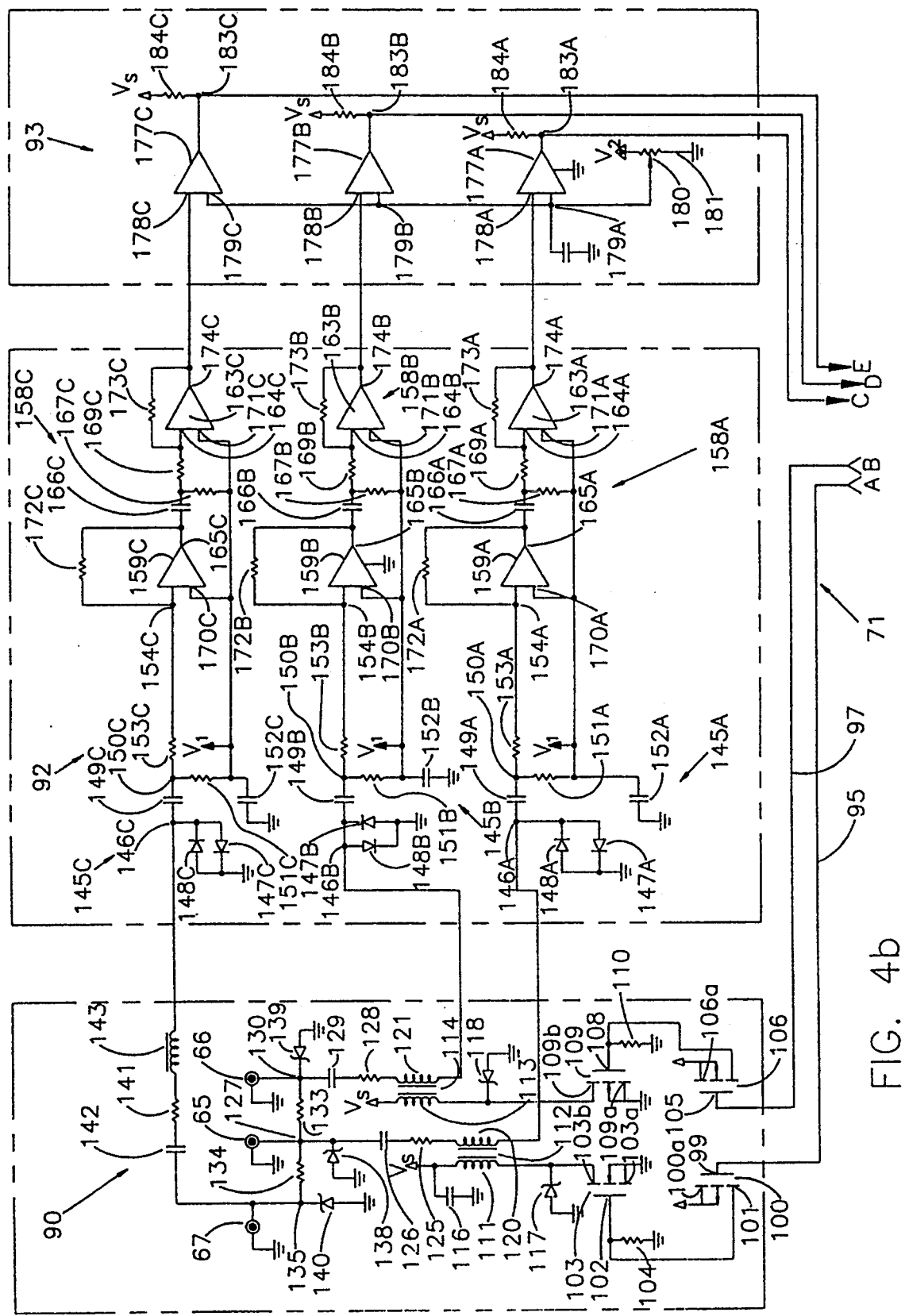

The circuit within housing 62 includes a control portion 70, illustrated in FIG. 4A, and an ultrasonic transducer interface circuit 71, illustrated in FIG. 4B. Control circuit 70 includes a microcomputer 72, which may be provided by a commercially available IC No. 8797BH microprocessor manufactured by Intel Inc., connected to a non-volatile memory 73 via a data bus 74. Non-volatile memory 73 provides a storage register for the set-up numbers and calibration numbers (e.g., a distance between transducers 65 and 66, distance $S_c$, and the previous target distance H which is stored between uses) used by the microcomputer to control operation of sensor 26, and may be provided by a commercially available IC No. X24C04. Microcomputer 72 is also connected to control circuit 76 via data bus 77. Control circuit 76 includes a hard reset and timer, and may be provided by a commercially available IC No. 1232N made for example by Dallas Semiconductor Inc., as well as a power supply and an oscillator for the microprocessor. The hard reset resets the microcomputer when the control circuit senses a lock-up of the microcomputer. Microcomputer 72 is also connected to receive user inputs from switch inputs 79 via data bus 80. The input switches provide user control of the system, and may include an "up" calibration switch, a "down" calibration switch, a "calibration mode" switch, and/or a "mode" switch for selecting the target type (e.g., string, curb, or flat surface). The diodes and LCD display in display panel 68 are driven by the microcomputer 72 via a data bus 83. Microcomputer 72 communicates with control unit 27 (FIG. 1) via an RS485 system communication interface 85 which is connected to microcomputer 72 via a data bus 86. The RS485 interface is known in the art, and accordingly is not further described herein.

Ultrasonic transducer interface circuit 71 includes ultrasonic drive and filter circuit 90, amplifier and filter circuit 92 and comparator circuit 93. Drive and filter circuit 90 has an input 95 connected to output 96 (FIG. 4A) and an input 97 connected to microprocessor output 98. Input 95 is connected to the gate 99 of MOSFET 100, having a drain 101 connected to the gate 102 of MOSFET 103 and a source 100a connected to supply voltage $V_s$. Similarly, input 97 is connected to gate 105 of transistor 106, the drain 107 connected to the gate 108 of MOSFET 109 and the source 106a connected to supply voltage $V_s$. Pull-down resistors 104 and 110 are connected between the gates of transistors 103 and 108, respectively, and earth potential to hold the gates at ground potential when transistors 100 and 106 are "off." When a high logic level is present on gates 99 and 105, the gates will not be lower than sources 100a and 106a, respectively, whereby transistors 100 and 106 will be "off." When the gates have a low logic level thereon, transistors 100 and 106 will turn "on" to place a high logic level voltage across pull-down resistors 104 and 110 which will turn transistors 103 and 109 "on" by pulling the gates 102 and 108 above the sources 103a and 109a.

Transistor 103 is connected in series with the primary winding 111 of transformer 112 between supply voltage $V_s$ and earth potential. Similarly, transistor 109 is connected in series with the primary winding 113 of transformer 114 between supply voltage $V_s$ and earth potential. A capacitor 116 is connected between voltage supply $V_s$ and earth potential to protect the circuit from the large current spike from the voltage source $V_s$ when transistors 103 and 109 are turned "on." Additionally, zener diodes 117 and 118 are connected between each junction of a primary transformer winding 111 and 113 and a drain 103b and 109b, respectively, and earth potential to provide over voltage protection. A resistor 125 and a capacitor 126 are connected in series between the secondary winding 120 of transformer 112 and a junction 127. Similarly, a resistor 128 and a capacitor 129 are connected in series between secondary winding 121 of transformer 114 and a junction 130. Junction 127 is connected to transducer 65 and junction 130 is connected to transducer 66. A resistor 133 is connected between junctions 127 and 130 and a resistor 134 is connected between junction 127 and junction 135. Each of junctions 127, 130 and 135 are connected to earth potential by respective zener diodes 138, 139 and 140, whereby transducers 65, 66 and 67 are protected against over voltage. Additionally, a capacitor 142 and a resistor 141 are connected in series between junction 135 and an inductor 143. Capacitors 126, 129 and 142; resistors 125, 128 and 141; and windings 120, 121 and 143 provide band pass filters for the signals output by or input to ultrasonic transducers 65, 66 and 67.

Additional filtering and amplification is provided by active filters in circuit 92. Thus, filter stages 145A, 145B and 145C are respectively connected to windings 120, 121 and 143 to receive filtered output signals from transducers 65, 66 and 67, respectively. Diodes 147A-147C and diodes 148A-148C are connected in an anode-to-cathode parallel arrangement which insures that the signals output from windings 120, 121 and 143 are within a range between $-0.7$ volts and $+0.7$ volts. Capacitors 149A-149C are connected between junctions 146A-146C and junctions 150A-150C to filter out low frequency signals output by the ultrasonic sensors. Resistors 151A-151C are connected between a supply voltage $V_1$ and junction 150A-150C. Supply voltage $V_1$ is also connected to earth potential by capacitors 152A-152C to filter noise and protect against high frequency transient currents. Resistors 153A-153C are connected between junction 150A-150C and output junctions 154A-154C, which together with feedback resistors 172A-172C set the gain of amplifiers 159A-159C in amplifier stages 158A-158C. Amplifiers 159A-159C may be provided by commercially available Op-Amps, IC No. CA3240. Second amplifiers 163A-163C, which may also be provided by commercially available Op-Amp IC No. CA3240, have first inputs 164A-164C connected to outputs 165A-165C of amplifiers 159A-159C via a series connection of capacitors 166A-166C and resistors 169A-169C. The junctions of capacitors 166A-166C and resistors 169A-169C are connected to a supply voltage $V_1$ by a resistors 167A-167C. Additionally, second inputs 170A-170C of differential amplifiers 159A-159C and second inputs 171A-171C of differential amplifiers 163A-163C are directly connected to supply voltage $V_1$. Feedback resistors 172A-172C are connected between inputs 154A-154C and outputs 165A-165C of amplifiers 159A-159C and feedback resistors 173A-173C are connected between inputs 164A-164C and outputs 174A-174C of amplifiers 163A-163C to set the gain of these amplifiers.

Comparator circuit 93 includes comparators 177A-177C which compare respective outputs of amplifier and filter circuit 92 with a reference potential. Thus, comparators 177A-177C have first inputs 178A-178C connected to outputs 174A-174C of amplifier circuit 92. Additionally, comparators 177A-177C comprise second inputs 179A-179C connected to a potentiometer wiper arm 180 of potentiometer 181 which is connected between $V_2$ and earth potential. Outputs 183A-183C of comparators 177A-177C are connected via pull-up resistor 184A-184C to supply voltage $V_s$ as well as being connected to inputs 186-188, respectively, of microcomputer 72.

The operation of the sensor system will now be described with reference to FIGS. 1-5. To transmit an acoustic wave via transducer 65, microcomputer 72 outputs a low logic level on output 96, which is connected via input 95 to gate 99 of MOSFET 100, which turns MOSFET 100 "on." When MOSFET 100 is "on," it pulls gate 102 of transistor 103 higher than source 103a which turns MOSFET 102 "on." When MOSFET 102 is "on," 5 volt supply voltage $V_s$ is supplied across primary winding 111 and coupled to secondary winding 120. That is, $V_s$ is approximately 5 volts DC, which is applied across the primary winding 112 when a single square pulse is applied to the gate of transistor 103. The single square pulse causes an oscillating sine wave to be generated by the secondary winding 120 of transformer 112 which is passed through resistor 125 and capacitor 126 to transducer 65. The oscillating sine wave supplied to transducer 65 has, for example, ten oscillations at a frequency of approximately 50 KHz. Transducer 65 is responsive to the oscillating signal on junction 127 to transmit an acoustic wave which will travel on path 190 to string 33 and be reflected from string 33 along path 191 to transducer 66. Additionally, the acoustic wave transmitted from transducer 65 on path 190 is reflected from string 33 and travels on path 190 back to transducer 65.

The signal received by transducer 66 will be supplied via capacitor 129, resistor 128, and inductor 121 to filter circuit 92. Similarly, the signal received by transducer 65 will be supplied through capacitor 126, resistor 125 and inductor 120 to filter circuit 92. The side lobe received by transducer 67 will pass through capacitor 142, resistor 141, and inductor 143 to filter circuit 92. Filter circuit 92 removes signals other than those having a frequency of approximately 50 KHz, which is the frequency of the acoustic wave generated by transducers 65 and 66, and limits the potential of the signal from inductors 120, 121, and 140 to a range between $-0.7$ and $+0.7$ volts. Amplifiers 159A–159C and 174A–174C will amplify the signals supplied from filter stages 145A–145C and provide an output signal to comparators 177A and 177B. Comparators 177A and 177B will, in turn, generate output pulses which are supplied to microcomputer 72 via inputs 186 and 187, respectively. The microcomputer detects the leading edge of the pulses output from comparators 177A–177C, and thus detects positive transitions on the outputs of comparators 177A–177C.

Microcomputer 72 measures the velocity of the acoustic wave emitted from transducer 65 from the side lobe of the wave which travels laterally and is detected by transducer 67 as described above. The lateral distance from transducer 65 to transducer 66 is predetermined by the spacing of these transducers. The orthogonal calibration transducer, and thus distance $S_c$, is most preferably approximately 6 inches from the transmitting transducer. The predetermined distance $S_c$ is divided by the time $t_c$ that it takes the lobe to travel from transducer 65 to transducer 67. The resulting velocity $V_c$ represents the velocity of the acoustic pulse in the particular air conditions under which the sensor is operating. Thus, the velocity $V_c$ changes as temperature and humidity change, and $V_c$ is continuously calculated to indicate the rate of travel of the acoustic wave. Most preferably, $V_c$ is determined by averaging the values of $V_c$ measured in the previous 64 transmissions of the acoustic wave.

To determine the vertical distance H from midpoint 189 to string 33, and the lateral distance b from the midpoint 189 to string 33, an acoustic wave is transmitted from transducer 65. A time period $t_A$ is measured, which is the time it takes the acoustic wave to travel from transducer 65 to string 33 and back to transducer 65. A time period $t_B$ is also measured which is equal the time it takes the acoustic pulse to travel from transducer 65 to string 33 to transducer 66. A distance a is the fixed distance between transducers 65 and 66. A distance $S_1$ which is distance 190, equals $V_c$ times $t_A$ divided by 2. A distance $S_2$, is distance 191 which equals $V_c(t_B-(\frac{1}{2})t_A)$. The following relationship is used to determine the value H:

$$H = \frac{S_c}{2t_c} \sqrt{\left(\frac{S_c^2}{a^2}\right)\frac{1}{t_c^2}(2t_A t_B^3 - t_A^2 t_B^2 - t_B^4) + t_A^2 + 2t_B^2 - 2t_A t_B - \left(\frac{a^2}{S_c^2}\right)t_c^2}$$

The distance B is defined by the following equation:

$$b = \left(\frac{S_c^2}{2a}\right)\left(\frac{t_B^2 - t_A t_B}{t_c^2}\right)$$

Alternately, the following equation may be used to compute H:

$$H = \left(\frac{S_c^2}{t_c^2}\right)\left(\frac{t_A t_B - \frac{1}{2}t_A^2}{2a}\right) \text{sincos}\left[\frac{t_B^2 - \frac{a^2 t_c^2}{S_c^2}}{t_A t_B - \frac{t_A^2}{2}} - 1\right]$$

Thus, H may be determined using the sine and arc cosine functions.

Because the acoustic waves received by transducers 65, 66, and 67 have a sinusoidal envelope, the first pulse received will not necessarily trigger comparators 177A–177C until the envelope exceeds the threshold value established by potentiometer 181. Thus, if the echo is weak, the first pulse may not exceed the threshold value until a few microseconds after the start of the echo. As a result, if the first pulse is used to measure the time between transmitting an acoustic wave and receiving the echo, the measured time will be a few microseconds off. Accordingly, it is not desirable to merely use the first pulses detected to calculate $t_A$ and $t_B$. Because each pulse within the wave is spaced by a uniform distance, interpolation may be used to determine when the first pulse occurred. For example, where the frequency of pulses within the acoustic waves is 50 KHz, the pulses will be spaced by 20 microseconds. Accordingly 20 microseconds will be subtracted from the time measured from the second pulse detected to estimate when the echo was first received by the transducer.

If the first pulse, or pulses, in the echo wave does not exceed the threshold value established by potentiometer 181 due to the envelope and strength of the echo, microcomputer 72 will miss the front pulse of the echo wave completely. It is accordingly necessary to determine whether pulses of the echo wave were missed by microcomputer 72. It may be determined that one or more pulses have been missed by monitoring consecutive measurements of the time between transmission of an acoustic pulse and reception of the echo therefrom. If the measured time period changes by a first amount, for example an increase in the measured echo time of between 10 and 30 microseconds occurs in consecutive measurements, a front pulse was missed. If the increase in consecutive time measurements is, for example, greater than 30 microseconds, it will be determined that two pulses were missed. For each pulse missed, an additional 20 microseconds will be subtracted from the actual time measurement. Thus, if it is determined that one pulse was missed, and the time measurement between transmission of the acoustic wave and reception of the second detected pulse is 70 microseconds, 40 microseconds would be subtracted from the 70 microsecond measurement. That is, 20 microseconds would be subtracted to account for the first pulse missed and an additional 20 seconds would be subtracted for the first pulse as measurements are always taken from the second detected pulse. If in subsequent consecutive measurements, the time period measured from consecutive transmissions of acoustic waves either increases or decreases by a time period of between 15 and 30 microseconds, then another pulse was missed or a previously missed pulse is being detected, respectively. The time period actually measured will be accordingly adjusted for the addition of a previously detected pulse by not subtracting one 20 microsecond period, or if an additional pulse is missed by subtracting another 20 microsecond period. The microcomputer will thus continually monitor consecutive time measurements to determine whether new front pulses are missed or previously missed pulses are now being detected. Furthermore, the time periods indicated above are provided merely for exemplary purposes.

Alternatively, the start of the echo may be estimated by determining the echo duration. This may be determined by counting the total number of pulses sensed by microcomputer 62 for an acoustic echo. Depending upon the number of pulses detected, which may vary, the estimated start of the echo will be determined by subtracting 0, 1 or 2 pulse-width periods. For example, from the time the first pulse is actually detected. Thus, if 5–9 pulses are counted, 20 microseconds will be subtracted from the time period actually detected. On the other hand, if 2–4 pulses are counted, 2 pulse widths will be subtracted from the time period actually detected. If one pulse is detected, the pulse will be ignored, whereas if ten or more pulses are detected, no time period will be subtracted from the time period actually detected. The above numbers for the pulses detected are only offered by way of example as the number of pulses in an echo signal will vary widely in actual practice.

Acoustic waves are continuously generated by the sensor 26 to monitor the distance between the string and the sensor as the grader moves. To determine the spacing of acoustic waves, the lesser of times $t_A$ or $t_B$ is initially determined by determining whether the first echo is received by transducer 65 or transducer 66. A fixed time period, for example 20 milliseconds, would be added to the lesser of $t_A$ and $t_B$ in order to determine when the next acoustic wave should be transmitted from transducer 65. Thus, the spacing of acoustic waves will vary depending upon when the first echoes are received. It should be noted, however, that the acoustic waves should not be spaced by a time period less than 25 milliseconds.

The above equations and description are for measurements of the actual time it takes for an acoustic pulse to travel from transducer 65 to string 33 and to be reflected to transducers 65 and 66. Although this is a preferred method of measuring distances H and b, it requires that the center of the transducers 65 and 66 be approximately 3–5 inches apart. If the two transducers are spaced directly adjacent one another, an accurate measurement of the difference between the distance $S_1$ and $S_2$ may be determined by measuring the phase difference between the first pulse detected from the acoustic echo received by each transducer. Transducers 65 and 66 must be placed directly adjacent one another such that the two pulses will be separated by a time duration which is less than a pulse-width of the pulses output by comparators 177A–177C in response to the reflected acoustic wave received by the transducer. The phase difference between the two signals provides an accurate time difference between the signal traveling distance $2S_2$, and the signal traveling distance $S_1+S_2$, and it does not depend upon an accurate estimate of when the echo first reaches transducers 65 and 66. It should be noted, however, that if the transducers 65 and 66 are placed too far apart, the phase difference will not be accurate as the phase difference between the two pulses detected will be more than one pulse-width apart, whereas the microcomputer would calculate the phase difference as if the pulse were less than one pulse-width apart.

Figure 7:
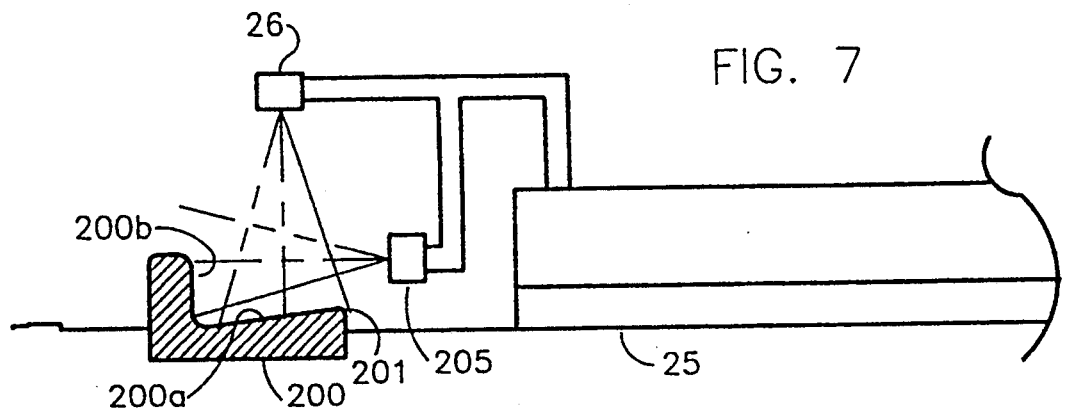
FIG. 7 is a front elevational view of a grader blade section including a pair of sensors mounted orthogonally to one another in an alternate embodiment of the sensor system according to the invention.
Figure 6:
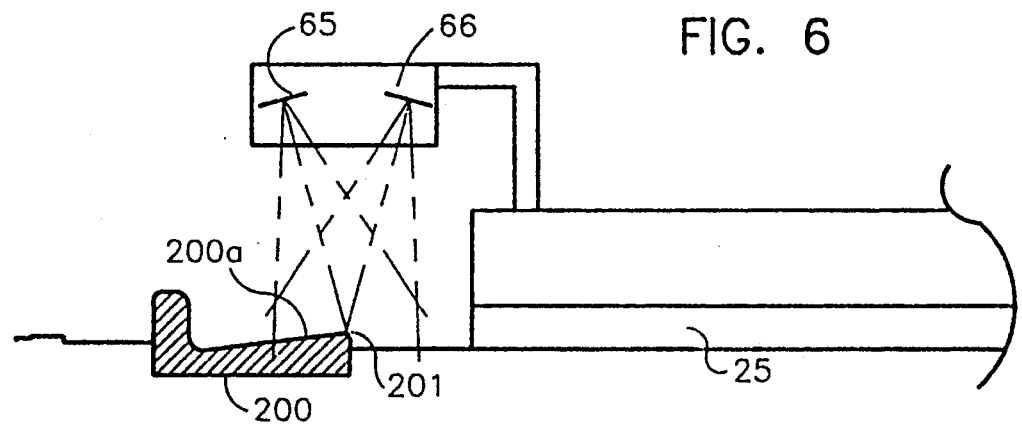
FIG. 6 is a front elevational view of a blade section including a sensor system according to the invention used with a curb.

The above-described embodiment was illustrated with a string used as the reference surface. However, graders are often used to grade a road surface adjacent a curb 200 (FIG. 6). To follow the curb, transducer 65 is positioned over the curb, and transducer 66 is positioned over the soil adjacent the curb, as illustrated in FIG. 6. Sensor 26 may then be used to follow a corner 201 of the curb. An acoustic wave is output by transducer 65 and the time it takes for that wave to travel to surface 200a and reflect back to transducer 65 is multiplied by the velocity of the acoustic wave to measure the vertical distance between transducer 65 and curb 200. Additionally, the offset from the edge of the curb may be measured by an acoustic wave generated by transducer 66. An acoustic wave is generated by transducer 66 in the same manner as the acoustic wave is generated by transducer 65. Thus, responsive to the signal on conductor 97 having a low logic level, transistors 106 and 109 are turned "on" causing an energizing pulse to pass through primary winding 113 of the transformer 114. The energizing pulse will be transformed into a sinusoidal signal by transformer 114, and the sinusoidal signal will be supplied from secondary winding 121 via resistor 128 and capacitor 129 to transducer 66. The acoustic signal output by transducer 66 will travel to corner 201 and reflect back to transducer 66, and the time that the wave takes to travel to the corner will vary as the lateral distance between transducer 66 and corner 201 varies. These variations are monitored to determine whether the sensor is moving toward or away from the edge of the curb. Alternatively, sensor 205 (FIG. 7) may be used to monitor the distance between sensor 205 and corner 201 or a second surface 200b of the curb. Sensor 205 must be positioned high enough so that the acoustic wave transmitted from sensor 205 does not reflect off surface 200a. Thus, sensor 26 measures the vertical distance between sensor 26 and surface 200a and the sensor 205 measures the lateral distance between sensor 205 and surface 200b of the curb.

Figure 8:
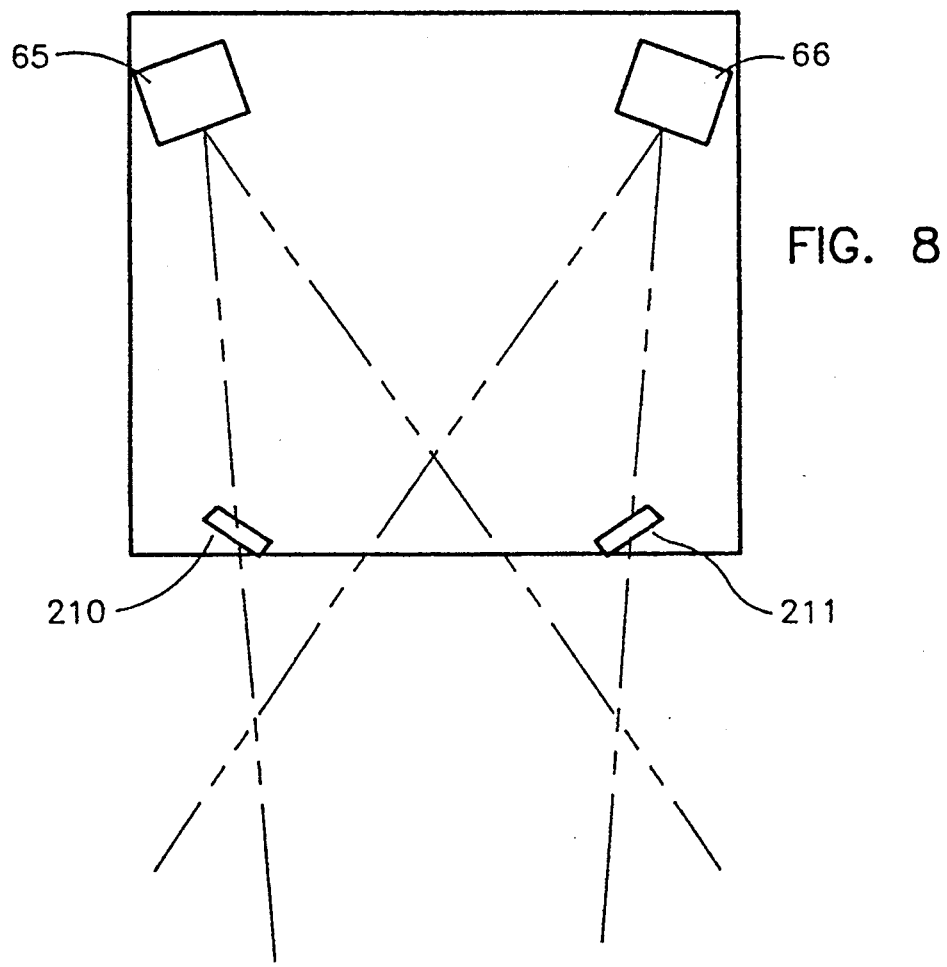
FIG. 8 is a front elevational view of a calibration system according to an alternate embodiment of a sensor system according to the invention.

An alternate velocity measuring apparatus utilizes a pair of reflectors 210 and 211 (FIG. 8) which are placed at the perimeter of the acoustic wave range of transducers 65 and 66. Thus, an acoustic pulse generated by transducer 65 will be reflected off reflector 210 toward reflector 211, which will in turn reflect the acoustic wave to transducer 66. The distance that the acoustic wave travels from transducer 65 to transducer 66 via reflectors 210 and 211 is known, and thus may be divided by the time it takes for the pulse to be transmitted from transducer 65 to transducer 66, via reflectors 210 and 211 in order to determine the velocity of the acoustic pulse. A disadvantage of this calibration method, however, is acoustic echoes may occur from reflections off transducer 66 which will travel back via surfaces 211 and 210 to transducer 65. The echo will then reflect off transducer 65 and travel back to transducer 66. Thus, the echo will continuously echo between transducer 65 and 66 until the acoustic wave dissipates, interfering with the calibration and operation of the sensor. Echoes may additionally reflect from other surfaces and interfere with the measurement of the acoustic wave velocity.

Once the vertical distance H and lateral distance b are measured, the control unit 27 is responsive to the measured distance to control mechanisms 28, 29 and 40 which control the position of the blade. Thus, if distance H varies, control mechanisms 28 and 29 will be controlled to raise or lower the blade to compensate for such variation. If the distance B varies, the control unit 27 will generate a control signal which will cause control mechanism 40 to displace blade 25 to the left or right to compensate for such variation. Thus, the blade 25 will be automatically maintained at a fixed position relative to reference string 33. Additionally, a display panel would most preferably be placed within operator housing 21 to provide the vehicle operator with a visual indication of the position of the blade relative to the reference surface. The vehicle operator may manually position the grader responsive to the visual signals to place the blade in the proper position.

Furthermore, the sensor of the illustrated embodiment provides a large advantage over prior art sensors in its versatility. In addition to the above-indicated targets, i.e., a string or a curb, the sensor may be used with a flat reference surface, such as a previously graded road bed. However, one transducer is used to transmit acoustic waves to the flat surface and one transducer is used to receive echoes thereof. Accordingly, an accurate measurement of the distance between the sensor and the road bed may be provided.

Thus, it can be seen that an improved ultrasonic sensor system is set forth which allows the vertical and lateral displacement from a reference surface to be monitored and used to control the position of a construction implement construction tool. Although the sensor is illustrated in a road grader, the sensor may be used with any construction implement, such as a curb layer or a paver, which must follow a reference surface. Additionally, although the calibration transducer is illustrated with two sensor transducers, the orthogonal transducer for detecting the side lobe may be utilized with a single sensor transducer.

Changes and modifications in the specifically disclosed embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A grade-establishing construction tool elevation control for maintaining the vertical position of the construction tool relative to a reference, said construction tool carried by the frame of a construction implement having a frame supported for horizontal motion in a longitudinal direction and said construction tool positioned with respect to said frame by a vertical-positioning device that responds to a hydraulic signal to adjust the vertical position of the construction tool, comprising:
   a first transducer configured to be carried by a grade-establishing construction tool for transmitting an acoustic wave and receiving a first reflection of said wave from a reference;
   a second transducer configured to be carried by said construction tool for receiving a second reflection of said acoustic wave from said reference;
   a sensor control coupled to said first and second transducers for monitoring the time at which said first and second reflections of the acoustic wave are received respectively by said first and second transducers in order to produce at least one electrical signal indicative of the vertical distance of said construction tool from the reference; and
   a hydraulic control responsive to said at least one electrical signal to provide a hydraulic signal to a vertical-positioning device as a function of the vertical distance of said construction tool from said reference in order to establish the grade with said construction tool at a predetermined vertical relationship to said reference, and thereby reduce grading errors resulting from lateral variation of said transducers with respect to said reference.

2. The control as defined in claim 1, wherein said sensor control converts said reflections of said acoustic waves into pulses and includes means responsive to said pulses for measuring the time it takes a wave to travel from said first transducer to said first and second transducers.

3. The control as defined in claim 2, wherein said sensor control measures the duration of said reflections, and said sensor control further includes adjustment means for adjusting said time measured when the reflections have a short duration.

4. The control as defined in claim 1, wherein said first and second transducers are positioned side-by-side.

5. A grade-establishing construction implement comprising:
   a frame supported for horizontal motion in a longitudinal direction and means for carrying a grade-establishing construction tool on said frame;
   a sensor being carried by said construction tool, said sensor including ultrasonic transducer means for generating at least one acoustic wave and for receiving reflections of said at least one acoustic wave from a reference at at least two locations and a sensor control coupled to said transducer means to measure time periods between transmission of said acoustic wave and reception of said reflections of said acoustic wave at said two locations; and
   wherein said means for carrying said construction tool includes position control means for varying the vertical position of said construction tool, said sensor control is responsive to the measured time periods for calculating the vertical distance of said sensor from said reference as a function of said measured time periods, said position control means is responsive to said vertical distance for positioning said construction tool in order to maintain a predetermined height of said construction tool with respect to said reference to thereby reduce height errors resulting from lateral variations of said sensor from said reference.

6. The construction implement as defined in claim 5, wherein said sensor control converts said reflections of said acoustic waves into pulses and includes means responsive to said pulses for measuring the time it takes a wave to travel from said first transducer to said first and second transducers.

7. The construction implement as defined in claim 6, wherein said sensor control measures the duration of said reflections, and said sensor control further includes adjustment means for adjusting said time measured when the reflections have a short duration.

8. The construction implement as defined in claim 5, wherein said two locations are side-by-side.

9. The construction implement in claim 5, wherein said construction tool is one of a road grader, a curb layer, and a paver.

10. A grade-establishing construction implement comprising:
   a frame supported for horizontal motion in a longitudinal direction and means for carrying a construction tool on said frame;
   a sensor being carried by said construction tool, said sensor including a first ultrasonic transducer for generating an acoustic wave and for receiving a first reflection of said acoustic wave from a reference and a second transducer for receiving a second reflection of said acoustic wave from said reference and a sensor control coupled to said first and second transducers to measure time periods between transmission of said acoustic wave and reception of said reflections of said acoustic wave, respectively, by said first and second transducers wherein said sensor further includes a third transducer positioned a predetermined distance from said first transducer for receiving a side lobe of the acoustic wave transmitted by the first transducer in order to determine the velocity of said acoustic wave; and
   wherein said means for carrying said construction tool includes position control means for varying the vertical position of said construction tool, said sensor control is responsive to the measured time periods and to the determined acoustic wave velocity for calculating vertical distance of said sensor from said reference as a function of said time periods and said velocity, said position control means is responsive to said vertical distance for positioning said construction tool vertically in order to maintain a predetermined height of said construction tool with respect to said reference to thereby reduce height errors resulting from lateral variations of said sensor from said reference.

11. The construction implement as defined in claim 10, wherein said sensor control converts said reflections of said acoustic waves into pulses and includes means responsive to said pulses for measuring the time it takes a wave to travel from said first transducer to said first and second transducers.

12. The construction implement as defined in claim 11, wherein said sensor control measures the duration of said reflections, and said sensor control further includes adjustment means for adjusting said time measured when the reflections have a short duration.

13. The construction implement as defined in claim 10, wherein said first and second transducers are side-by-side.

14. The construction implement in claim 10, wherein said construction tool is one of a road grader, a curb layer, and a paver.

15. A road grader comprising:
   a frame supported for horizontal motion in a longitudinal direction and means for carrying a blade on said frame;
   a sensor carried by said blade and including a transmitter for transmitting at least one acoustic signal and at least two laterally spaced receivers for receiving echoes of said at least one acoustic signal from a reference, said sensor including a control responsive to measured time periods between the transmission of said at least one acoustic signal and the reception of said echoes thereof, respectively, by said at least two receivers for producing an indication of a vertical distance of the sensor relative to the reference; and
   position control means carried by said road grader, said position control means for adjusting the vertical position of said blade in response to said indication to maintain said vertical distance constant to thereby reduce height errors resulting from lateral variations of said sensor from said reference.

16. The road grader as defined in claim 15, wherein said transmitter is defined by a first transducer and said receivers are defined by said first transducer and a second transducer, said transducers for transmitting and receiving an acoustic wave.

17. The road grader as defined in claim 16, wherein said first and second transducers are positioned side-by-side and wherein a reflection of an acoustic wave transmitted by said first transducer is received by said first and second transducers.

18. The road grader as defined in claim 15, wherein said sensor includes first and second reflectors whereby an acoustic wave transmitted from said first transducer will reflect off said first and second reflectors and be received by said second transducer and the velocity of said acoustic wave may be measured.

* * * * *